United States Patent Office 3,370,452
Patented Feb. 27, 1968

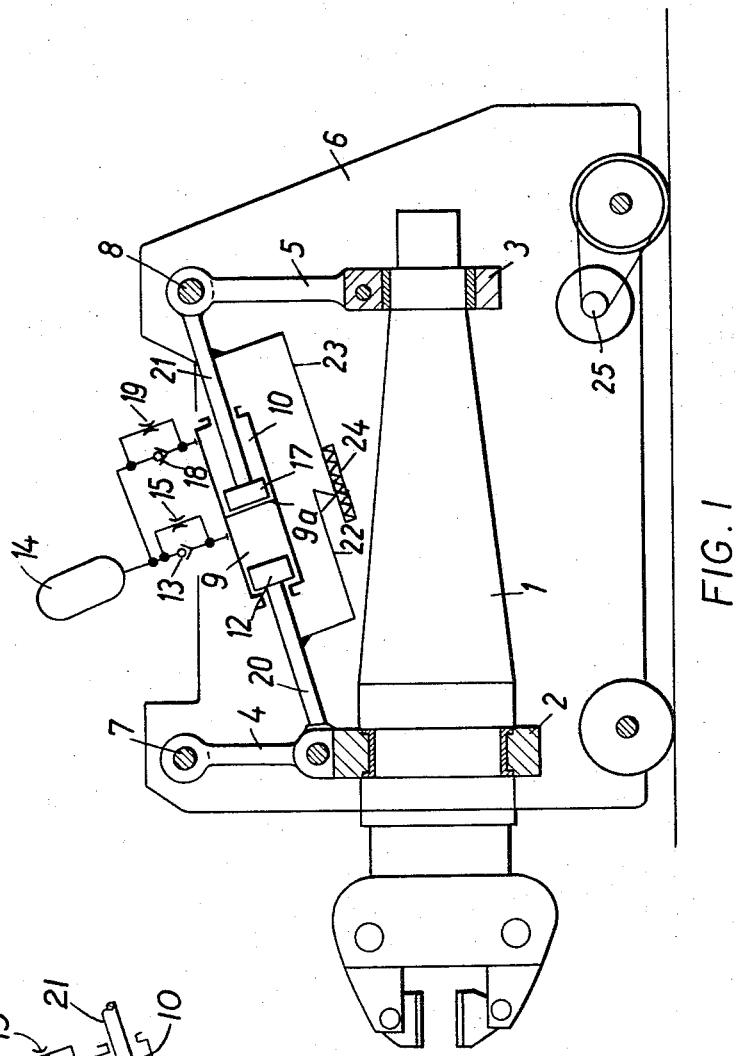
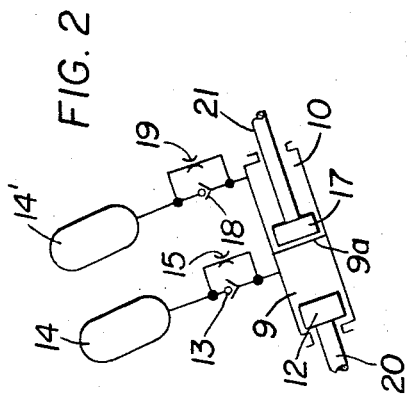
FIG. 1
FIG. 2

3,370,452
MOBILE FORGING MANIPULATORS
Ernst Theodor Sack, Hosel, Manfred Hansen, Dusseldorf-Benrath, and Horst Schenk, Dusseldorf-Rath, Germany, assignors to Maschinenfabrik Sack G.m.b.H., Dusseldorf-Rath, Germany
Filed July 22, 1965, Ser. No. 473,935
Claims priority, application Germany, July 30, 1964, M 61,922
3 Claims. (Cl. 72—420)

ABSTRACT OF THE DISCLOSURE

Mobile forging manipulator has a gripper mounted on a carriage for rotation about its longitudinal axis and movable axially in both directions against a resilient restraint provided by a hydraulic cylinder and piston unit having two pistons, one side of each being open to atmosphere, and which are arranged so that one slides in the cylinder and the other is held by an abutment in response to movement of the gripper in one direction and the other slides and the first is held by an abutment in response to movement of the gripper in the other direction. The movement of either piston away from its abutment displaces hydraulic liquid from the cylinder into a pressurized reservoir through a non-return valve which opens to allow flow to the reservoir, and a by-pass having a throttle of adjustable cross-section allows flow from the reservoir to the cylinder on return movement of the piston.

During operation, the grippers of forging manipulators are subjected to axial forces in both directions resulting from the deformation of the forgings gripped by them and transmitted to them by the forging press or hammer. It is therefore common practice to mount the grippers on a gripper carriage so that it can move axially against a resilient restraint under these forces. Mechanical or hydraulic resilient means are used. However, the known resilient mounting of the grippers or gripper carrier in the gripper carriage tends to allow oscillations of the grippers and of the workpiece held in them to occur so that the forging work is adversely affected.

The object of this invention is to construct a mobile carriage mounted forging manipulator with grippers which are rotatably mounted about their longitudinal axis on the gripper carriage and are resiliently supported against axial forces acting in each direction from the press or hammer in such a manner that the grippers are deflected by these forces but return into their initial position relative to the gripper carriage without oscillation after these forces cease.

To this end, according to this invention, in such a manipulator in which the gripper is mounted so that it can rotate about its longitudinal axis, the resilient restraint is provided by a hydraulic cylinder and piston unit having two pistons one side of each which is open to the atmosphere and which are arranged so that one slides in the cylinder and the other is held by an abutment in response to movement of the gripper in one direction and the other slides and the first is held by an abutment in response to movement of the gripper in the other direction, the movement of either piston away from its abutment displacing hydraulic liquid from the cylinder into a pressurized reservoir through a non-return valve which opens to allow flow to the reservoir and has a by-pass with a throttle of adjustable cross-section to allow flow from the reservoir to the cylinder on return movement of the piston.

The non-return valves permit easy deflection of the grippers against a constant restoring force which is determined by the pressure in the reservoir and this pressure can be easily adapted to the moving masses and forces which arise, while the throttles by-passing the non-return valves ensure oscillation free return of the grippers into their starting position in the gripper carriage as a result of the liquid which is under pressure.

A further advantage of this arrangement is that the gripper carriage with the forging can be continuously moved forward in the direction of the gripper axis towards the forging machine. Then whenever the workpiece is held by the forging machine the grippers move back against the resilient restraint and whenever the workpiece is released, the workpiece is pushed forward again by the restoring force of the gripper supporting means.

A simple supplementary device can be used with this arrangement so that the feed movement of the gripper carriage can be adjusted to a pre-selected adjustable feed rate adapted to the forging work in hand, this value being automatically maintained.

A particularly simple arrangement requiring relatively little additional space, is obtained if the two cylinder chambers filled with hydraulic liquid are located on different sides of a transverse wall dividing a single cylinder whose ends each guide one of the two piston rods and the abutment for one piston is formed by the transverse wall and the abutment for the other piston is formed by one of the cylinder ends.

FIG. 1 is a diagrammatic side view of an example of a forging manipulator constructed in accordance with the invention; and FIG. 2 is a diagrammatic view of a modified form of the hydraulic system of FIG. 1.

A gripper 1 is suspended in a mobile gripper carriage 6 in bearings 2 and 3 on rocking arms 4 and 5. The arms 4 and 5 can swing on axes 7 and 8, the bearings 2 and 3 together with the gripper 1 performing a substantially horizontal movement. To damp these rocking movements there are two hydraulic cylinder and piston units with cylinder chambers 9 and 10 filled with hydraulic liquid and containing pistons 12 and 17, of which the piston 12 has a piston rod 20 pivotally connected to the gripper support bearing 2 and the piston 17 has a piston rod 21 fixed to the arm 5 at the pivot axis 8 and is thus pivotally connected to the carriage 6. The cylinder chambers 9 and 10 are parts of one cylinder which is divided by a transverse wall 9a. In the initial position of the gripper 1 the piston 17 is located against the transverse wall 9a and the piston 12 against the cylinder end in which its piston rod 20 is guided. The cylinder chamber 9 is connected to a hydraulic reservoir 14 containing liquid subjected to an adjustable air pressure through a non-return valve 13 which opens to allow flow to the reservoir and through a pipe which by-passes this valve and incorporates a throttle 15 of adjustable cross-section. The cylinder chamber 10 is similarly in communication with the reservoir 14 through an non-return valve 18 and a throttle 19. The two cylinder spaces located on the left of the pistons 12 and 17 are open to atmosphere.

The arrangement described functions as follows:

If a force is exerted in the direction of an arrow 11 on the gripper 1 the piston 12 will be pressed into the cylinder chamber 9. In so doing, it displaces some of the liquid in this chamber through the non-return valve 13 into the reservoir 14. As soon as the force acting in the direction of the arrow 11 ceases, the liquid will flow under pressure from the reservoir 14 through the throttle 15 back into the cylinder chamber 9 until the piston 12 once again rests against the front end of the cylinder. The gripper will then once again have reached its starting position in the carriage 6. During these movements the cylinder is supported by the transverse wall 9a, the piston 17 and the piston rod 21 on the gripper carriage 6.

A force acting on the gripper 1 in the direction of an arrow 16 pulls the piston 17 from the transverse wall 9 into the cylinder chamber 10 and causes liquid to be displaced from this chamber 10 through a non-return valve 18 into the reservoir 14 and the gripper is subsequently restored into its starting position by the liquid discharged from the reservoir through the throttle 19 into the cylinder chamber. During these movements the cylinder is held by the piston 12 acting on its left-hand end.

The deflecting movements of the stripper are rapid and unimpeded because the liquid can escape practically without obstruction through the non-return valves 13 and 18 into the reservoir 14. The restoring movements, on the other hand, are heavily damped because of the enforced return flow of liquid through the throttles 15 and 19 thus preventing gripper oscillations and impacts. To achieve this it is merely necessary to match the adjustable throttle cross-sections to the moving masses and forces anticipated.

In addition, the piston rods 20 and 21 are provided with sensing elements 22 and 23 which transmit the piston rod movements relative to each other to a measuring instrument 24. This instrument compares these movements with the specified value of desired gripper carriage feed rate and evaluates deviations from this value for the purpose of controlling a carriage drive 25.

In some cases it may be advantageous to give different values to the restoring forces acting on the deflected gripper in different directions. For this purpose, as shown in FIG. 2, a separate reservoir 14 and 14' whose pressure medium can be subjected to adjustable pressures may be provided respectively for each of the cylinder chambers 9 and 10 as well as to their individual non-return valves 13 and 18 and throttles 15 and 19.

We claim:
1. A mobile forging manipulator having a gripper mounted on a carriage so that it can rotate about its longitudinal axis and move axially in both directions against a resilient restraint provided by a hydraulic cylinder and piston unit having two pistons one side of each which is open to the atmosphere and which are arranged so that one slides in the cylinder and the other is held by an abutment in response to movement of the gripper in one direction and the other slides and the first is held by an abutment in response to movement of the gripper in the other direction, the movement of either piston away from its abutment displacing hydraulic liquid from the cylinder into a pressurized reservoir through a non-return valve which opens to allow flow to the reservoir and has a by-pass with a throttle of adjustable cross-section to allow flow from the reservoir to the cylinder on return movement of the piston.

2. A manipulator according to claim 1, in which the cylinder is divided into two chambers by a transverse wall with one piston on each side of the wall, the abutment for one piston being formed by the transverse wall and the abutment for the other piston being formed by a cylinder end.

3. A manipulator according to claim 1, in which the liquid displaced by movement of each piston flows to a separate reservoir.

References Cited

UNITED STATES PATENTS 2,720,800   10/1955   Taylor _____ 72—420
2,758,734   8/1956    Westling _____ 72—420 X CHARLES W. LANHAM, *Primary Examiner.*

E. SUTTON, *Assistant Examiner.*